US010370081B2

(12) United States Patent
Stock

(10) Patent No.: US 10,370,081 B2
(45) Date of Patent: Aug. 6, 2019

(54) UAV MOUNTING SYSTEM

(71) Applicant: Matthew Stock, Miami, FL (US)

(72) Inventor: Matthew Stock, Miami, FL (US)

(*) Notice: Subject to any disclaimer, the term of this patent is extended or adjusted under 35 U.S.C. 154(b) by 285 days.

(21) Appl. No.: 15/273,773

(22) Filed: Sep. 23, 2016

(65) Prior Publication Data
US 2017/0081014 A1 Mar. 23, 2017

Related U.S. Application Data

(60) Provisional application No. 62/222,491, filed on Sep. 23, 2015.

(51) Int. Cl.
*B64C 1/22* (2006.01)
*B64C 39/02* (2006.01)
*B64D 9/00* (2006.01)

(52) U.S. Cl.
CPC ............. *B64C 1/22* (2013.01); *B64C 39/024* (2013.01); *B64D 9/00* (2013.01); *B64C 2201/108* (2013.01); *B64C 2201/123* (2013.01); *B64C 2201/127* (2013.01); *Y02T 50/46* (2013.01)

(58) Field of Classification Search
CPC ....... B64C 1/08; B64C 1/22; B64C 2201/123; B64C 2201/126; B64C 2201/127; B64C 2201/128; B64C 3/22; B64C 25/001
See application file for complete search history.

(56) References Cited

U.S. PATENT DOCUMENTS

| 6,343,452 | B1* | 2/2002 | Holden | B64C 1/08 |
| | | | | 52/653.2 |
| 9,914,539 | B1* | 3/2018 | Bar-Zeev | B64D 1/14 |
| 2014/0037278 | A1* | 2/2014 | Wang | F16M 11/10 |
| | | | | 396/55 |
| 2014/0131507 | A1* | 5/2014 | Kalantari | A63H 27/12 |
| | | | | 244/2 |
| 2016/0009371 | A1* | 1/2016 | Atzert | B64C 1/36 |
| | | | | 244/118.1 |
| 2016/0355257 | A1* | 12/2016 | Chappell | B64C 39/024 |
| 2017/0029099 | A1* | 2/2017 | Chen | B64C 27/08 |
| 2017/0085840 | A1* | 3/2017 | Mizushina | H04N 5/2257 |
| 2017/0210451 | A1* | 7/2017 | Oh | B64D 1/10 |

* cited by examiner

*Primary Examiner* — Philip J Bonzell
*Assistant Examiner* — Tye William Abell
(74) *Attorney, Agent, or Firm* — Nicholas R. Lewis, P.A.

(57) ABSTRACT

A payload system for an unmanned aerial vehicle ("UAV"), including a plurality of payload modules configured to attach to an underside of the UAV, wherein each payload module defines a curved surface having a plurality of mounting holes therethrough, and wherein the plurality of payload modules is interconnected to form a substantially continuous mounting surface.

9 Claims, 6 Drawing Sheets

UAV MOUNTING SYSTEM

CROSS-REFERENCE TO RELATED APPLICATION

This application is related to and claims priority to U.S. Provisional Patent Application Ser. No. 62/222,491, filed Sep. 23, 2015, entitled IMPROVED UAV BRACKETED MOUNTING SYSTEM, the entirety of which is incorporated herein by reference.

STATEMENT REGARDING FEDERALLY SPONSORED RESEARCH OR DEVELOPMENT n/a

FIELD OF THE INVENTION

The present invention relates to a methods and systems for mounting various instruments, optics, or other devices and/or payloads to unmanned aerial vehicles.

BACKGROUND OF THE INVENTION

The rising popularity and mainstream use of unmanned aerial vehicles ("UAV") for commercial and industrial uses has led to the development of numerous applications and services involving such UAVs. With such burgeoning development, it is becoming increasingly difficult to adequately mount specific selections or combinations of optical, photographic, or other instrumentation and devices to a UAV for individualized use in a particular application, which may also include employing the UAV as a transport and/or delivery vehicle for goods, equipment, instrumentation, or the like. While some existing UAV mounting systems may include one or more supports or gimbals to attach a small number of instruments, the range of adjustments or configurations continues to be limited, thus restricting use and effectiveness of a UAV. The present disclosure provides improved systems and methods of use thereof for attaching payloads externally to a UAV that offer increased flexibility in carrying capacity and mounting position/orientation than is currently available.

SUMMARY OF THE INVENTION

The present disclosure provides improved systems and methods of use thereof for attaching payloads externally to a UAV that offer increased flexibility in carrying capacity and mounting position/orientation. For example, a mounting system is provided for a variety of UAVs, including gyroscopic helicopters, tri-copters, quad-copters, and UAVs with more than 4 propellers. The mounting system may include one or more brackets that can function as a single bracket or a plurality of brackets depending on the needs of the user, carrying capacity of the UAV, and height of landing gear already present in UAV. There is no limit to the number of brackets that can be combined. The mounting system may be used to carry photographic and video equipment including but not limited to: lighting, camera, sound, batteries, and video recording devices as part of a payload.

Mounting brackets of the present disclosure may consist of a series of threaded holes and slots sized to standard photographic camera mount sizes, including for example, ¼" and/or ⅜" diameter. Multiple brackets may be implemented on a single UAV to increase the flexibility of the positioning of the payload, thereby exponentially increasing, among others, potential photographic and video applications.

A payload system for an unmanned aerial vehicle ("UAV") is disclosed, including a plurality of payload modules configured to attach to an underside of the UAV, wherein each payload module defines a curved surface having a plurality of mounting holes therethrough, and wherein the plurality of payload modules is interconnected to form a substantially continuous mounting surface. The mounting holes may be hexagonally shaped, and/or the plurality of payload modules may be sufficiently rigid to support a weight of the UAV. The substantially continuous mounting surface may define a circumference between approximately 180 degrees and approximately 300 degrees. The plurality of payload modules may be interconnected by one or more connectors defining protrusions matable with one or more of the mounting holes. The one or more connectors may each include four protrusion arranged in a substantially "+" shaped configuration. The plurality of payload modules may define a basket configured to carry one or more instruments therein. Each of the plurality of payload modules may be vertically aligned to form columns. The plurality of mounting holes of each payload module may be configured in an elongated configuration having three holes across a width and nine holes along a length of the payload module. Each of the plurality of payload modules may be constructed from a buoyant material. The payload system may include at least one of a video device, photography device, sensor, and instrument mounted to at least one of the payload modules. The payload system may include one or more lighting elements attached to at least one of the payload modules.

An unmanned aerial vehicle ("UAV") mounting system is provided, including a plurality of vertically-oriented payload modules configured to attach to the UAV, each payload module defining a curved surface having a plurality of hexagonally-shaped mounting holes therethrough; a plurality of connectors interconnecting the plurality of payload modules, wherein each connector defines one or more hexagonally-shaped protrusions matable with the mounting holes; and at least one of a video device, photography device, sensor, and instrument mounted to the payload modules. The plurality of payload modules may be sufficiently rigid to support a weight of the UAV when landing. The interconnected payload modules may define a substantially continuous mounting surface around at least a portion of the UAV. The substantially continuous mounting surface may define a circumference between approximately 180 degrees and approximately 300 degrees. The plurality of payload modules may define a basket configured to carry one or more instruments therein.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
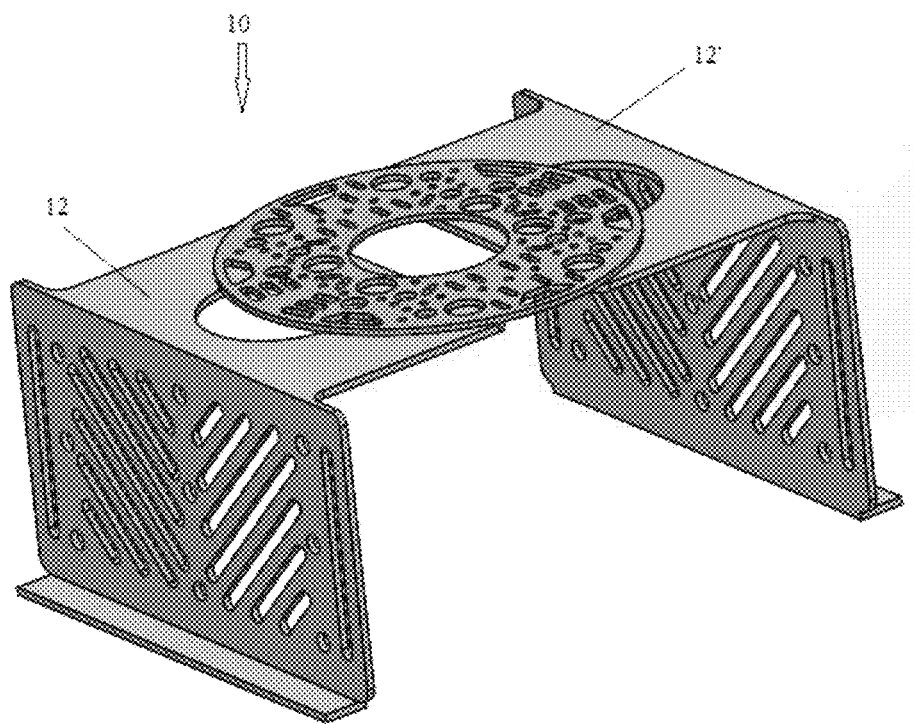
FIG. 1 is an illustration of an embodiment of a mounting system for an unmanned aerial vehicle constructed in accordance with the principles of the present invention.
Figure 2:
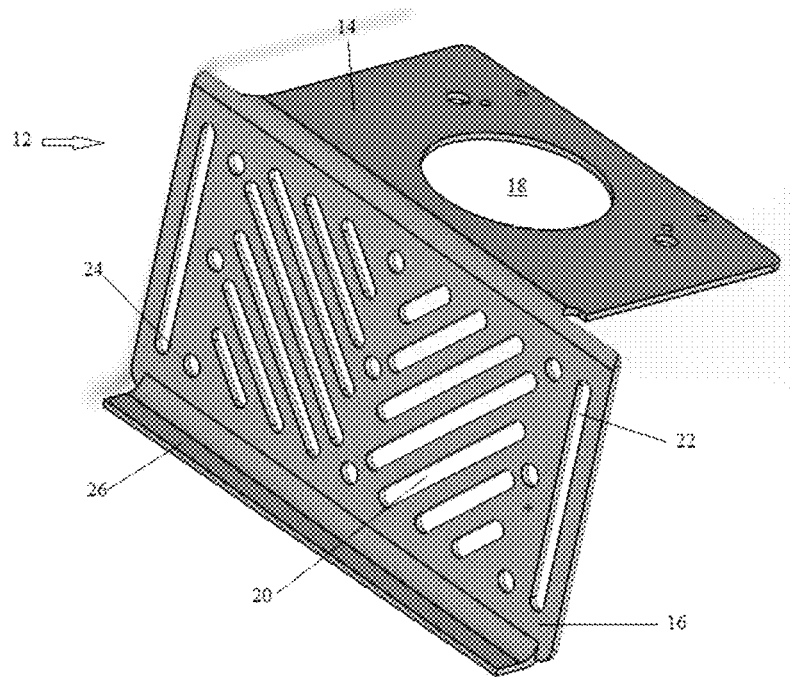
FIG. 2 is an illustration of an example of a mounting bracket of the mounting system shown in FIG. 1.

The present disclosure provides improved systems and methods of use thereof for attaching payloads externally to a UAV that offer increased flexibility in carrying capacity and mounting position/orientation. Now referring to FIGS. 1-4, an example of an exemplary mounting system 10 for an unmanned aerial vehicle is shown. The system 10 may generally include one or more brackets 12, 12' that are engageable with a UAV (not shown) to facilitate attaching and orienting payload devices, such as those for photography, cinematography, scientific instrumentation, or other devices or components, to the UAV. The brackets 12 may be constructed from a variety of materials providing desired rigidity, strength, and weight specifications, and may include, for example, aluminum, titanium, carbon fiber, or other polymers, alloys, and/or combinations thereof.

The bracket(s) 12 may generally include a first portion 14, and a second portion 16 coupled to or extending from the first portion 14 at an angle. In one example, the second portion may be substantially perpendicular to the first portion, however, a range of angular configurations are contemplated. The first portion 14 of the bracket 12 may define one or more UAV mounting features 18 that allow the bracket 12 to be coupled to a UAV (either directly or to an extension or intermediary component of the UAV) with one or more fasteners or linkages. The UAV mounting feature(s) 18 may, for example, include one or more openings or apertures in the first portion 14 of the bracket 12 that correspond to a mounting hole pattern of a variety of UAVs as per different UAV manufacturer specifications.

Figure 3:
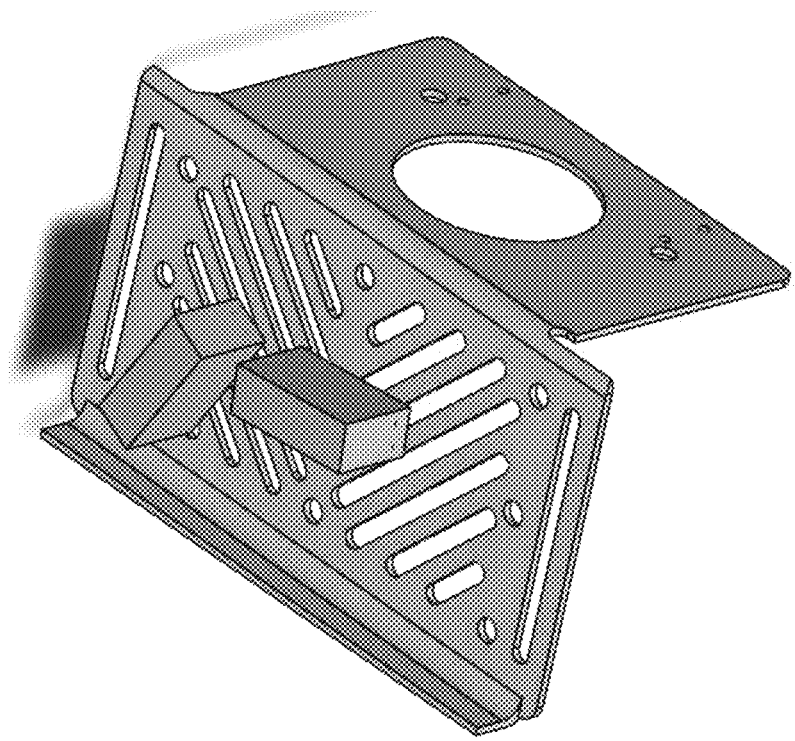
FIG. 3 is an illustration of the bracket of FIG. 2 with additional mounting components (such as, for example, R/C servo motors) attached thereto.

The second portion 16 of the bracket 12 may include a plurality of apertures or mounting features therein to attach and orient numerous devices suited for a particular application. For example, the second portion 16 may include a first plurality of slots 20 that allow a particular device or instrument to be slidably positioned along a range of the overall width and height of the second portion 16, as shown in FIG. 3, for example. For example, as shown in the accompanying figures, the first plurality of slots may be angularly oriented at an approximately 45-degree angle with respect to the edges of the second portion.

Figure 4:
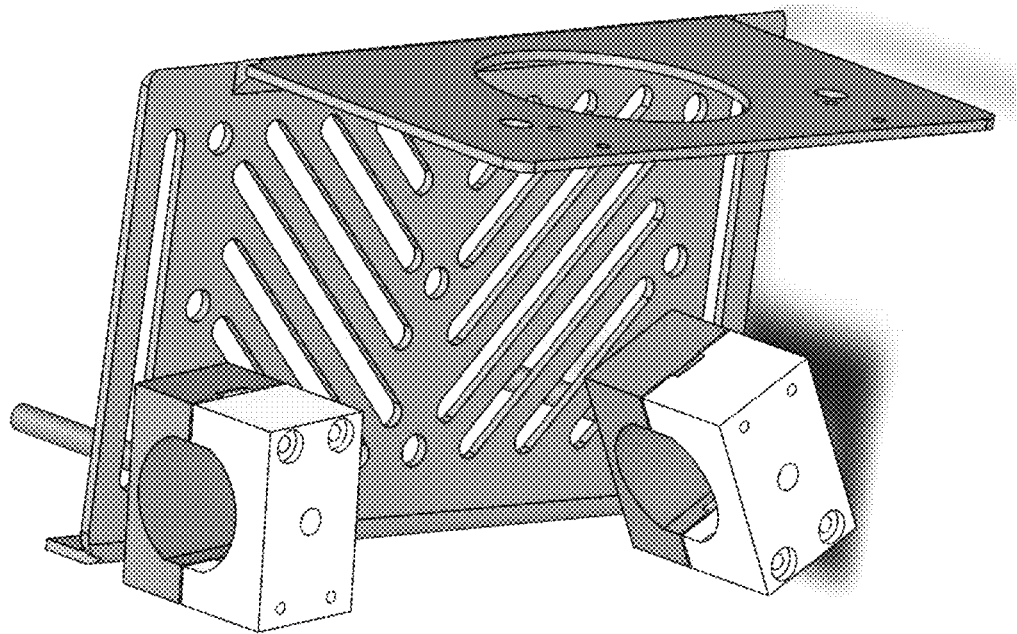
FIG. 4 is another illustration of the bracket of FIG. 2 with additional mounting components attached thereto.
Figure 5:
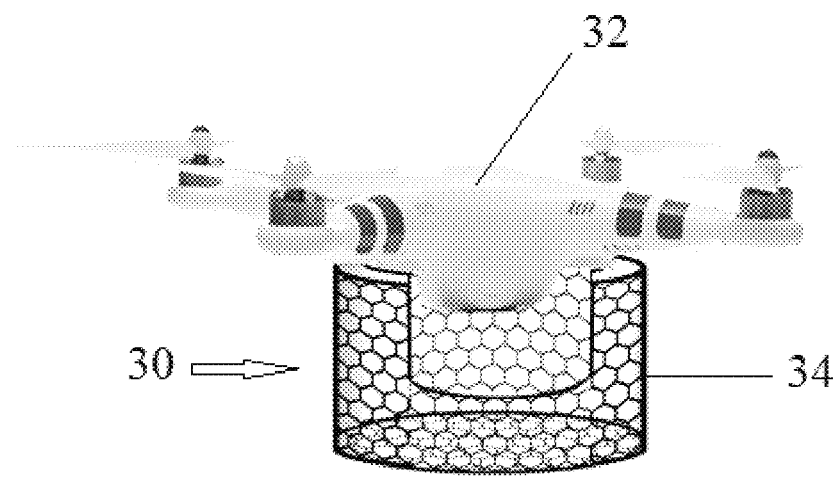
FIG. 5 is an illustration of another embodiment of a payload mounting system for an unmanned aerial vehicle constructed in accordance with the principles of the present invention.

The second portion 16 of the bracket 12 may also include a second plurality of slots 22 positioned along a height of the second portion adjacent to an outer edge of the second portion, also allowing the attachment and orientation of a selected device or instrument in numerous selectable positions along the bracket 12 as shown in FIG. 4.

The second portion 16 of the bracket 12 may also include a plurality of discrete mounting holes or locations 24 thereon for the attachment of desired equipment or payload items. For example, as shown in the accompanying figures, the plurality of discrete mounting locations 24 may be positioned or patterned about the second portion between the first and second pluralities of slots. A flared surface or ridge 26 may extend form or otherwise be attached to the second portion 16 of the bracket 12 to allow additional devices or instrumentation to attach thereto with a clip or clamping mechanism.

In an exemplary use of the system 10, brackets 12 may be mounted on the cardinal points of the UAV and can be mounted in series with 1, 2, 3, or 4, brackets on a single mounting plane. Additional brackets 12 may also be mounted below the primary brackets to create a secure box or contained space to contain various payloads. The positioning features of the system 10 allow the user to determine the precise positioning of the payload while securing it safely and maintaining an even weight distribution essential for flight. The features set forth herein allow users to mount payloads directly to the exterior or interior face of one or more brackets or to use a variety of clamps to secure payloads below the center of gravity of the UAV on an interior face of the bracket(s). Additionally, threaded rods (not shown) can be secured through the interior of the bracket for additional stability. Such rods can be used, for example, to attach a camera platform creating a stable platform for 1-axis rotation, or the user can mount their own multi-axis gimbal using the structural support rods.

Figure 6:
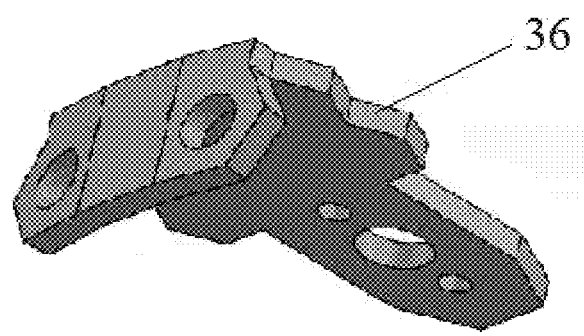
FIG. 6 is an illustration of an example of a mounting bracket of the mounting system shown in FIG. 5.

Now referring to FIGS. 5-12, an additional example of a UAV payload and mounting system 30 and components thereof are shown for use with a UAV 32. Similar to the exemplary embodiment shown in FIGS. 1-4, the system 30 offer increased flexibility in carrying capacity and mounting position/orientation for a variety of payload devices, such as those for photography, cinematography, scientific instrumentation, search and rescue, or other desirable devices or components. The system 30 generally includes a payload structure 34 that attaches to the UAV 32 through the use of one or more attachment elements or brackets 36, as shown in FIG. 6. The attachment element(s) 36 may include one or more bolt or fastener hole patterns sized and shaped to be matably connected to corresponding mounting locations on the UAV 32, as well as one or more bolt or hole fastener hole patterns that are matable and complimentary to fastening locations on the payload structure 34. The attachment element(s) 36 may be constructed from a variety of materials providing desired rigidity, strength, and weight specifications, and may include, for example, aluminum, titanium, carbon fiber, or other polymers, alloys, and/or combinations thereof.

Figure 7:
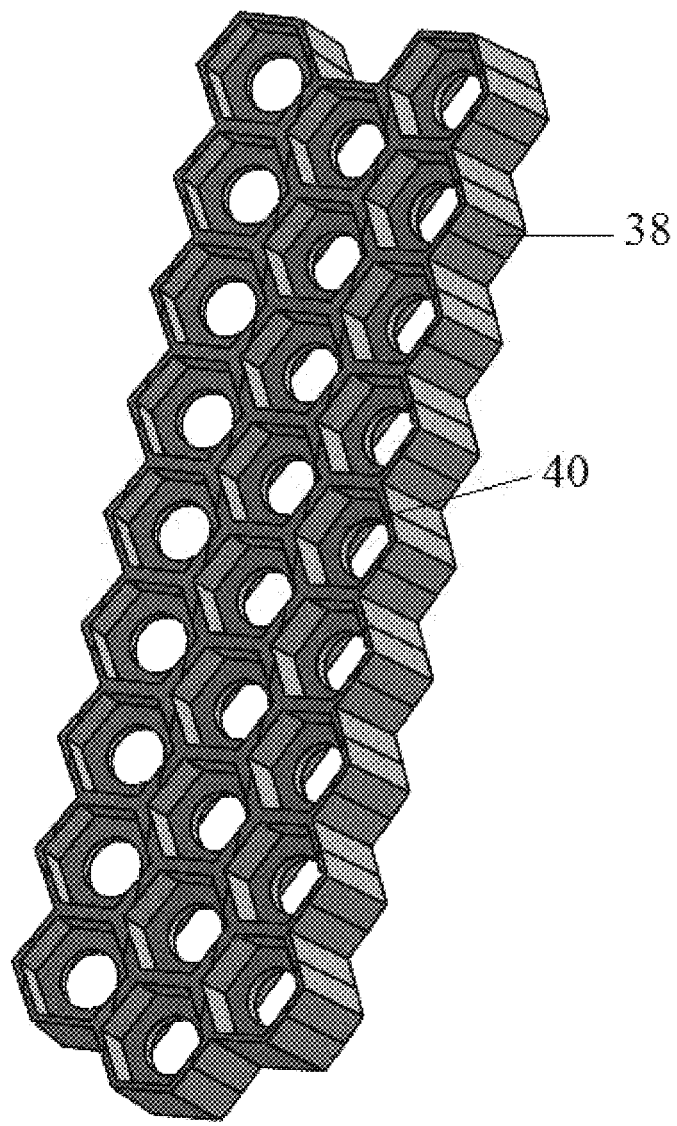
FIG. 7 is an illustration of an example of a payload structure module of the mounting system shown in FIG. 5.
Figure 8:
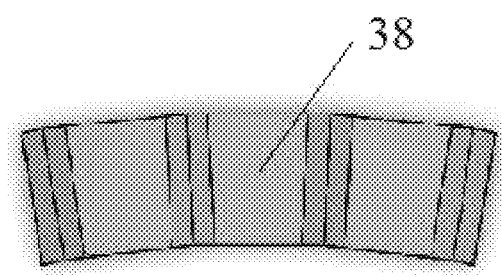
FIG. 8 is a top view illustration of the payload structure module shown in FIG. 7.
Figure 9:
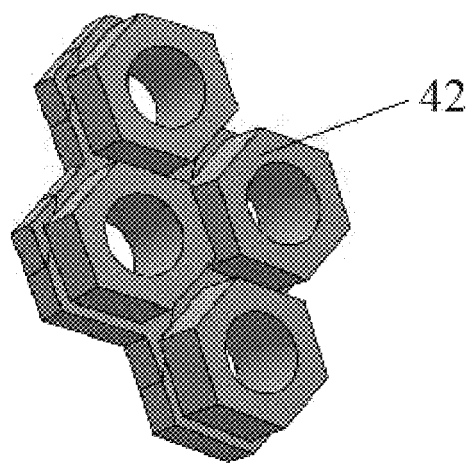
FIG. 9 is an illustration of an example of a connector of the mounting system shown in FIG. 5.
Figure 10:
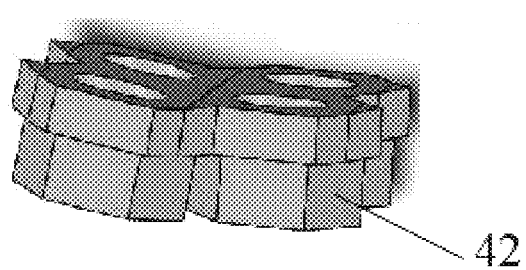
FIG. 10 is another illustration of the connector shown in FIG. 9.

Now referring to FIGS. 7-8, the payload structure 34 may comprise one or more payload structure modules 38 that are selectively configurable about the UAV 32 to circumscribe a payload region of the UAV 32 or a portion thereof (for example, between approximately 180 degrees and approximately 300 degrees). The modules 38 may include one or more rows and columns of individual cells 40 that facilitate attachment of payload equipment to the payload structure 34 and thus the UAV 32. For example, in the illustrated embodiment shown in FIG. 7, the payload module 38 is comprised of a three cell-by-nine-cell configuration. Each cell 40 includes a through-hole allowing for a fastener 41, such as a bolt or screw, to pass therethrough to attach the various payload devices, instruments, or the like. The cells 40 may each constitute a shaped recess or countersink to reduce the overall weight of the payload modules 38, while maintaining structural rigidity and strength for the secure attachment of auxiliary devices. The shaped recess or countersink also allows users to mount photographic, video, or other equipment 43 on the inside surface or curvature of the structure.

In the example shown in the figures, the payload structure 34 includes a plurality of hexagonally-shaped cells 40 that form a honeycomb-like structure around the payload region of the UAV 32. The honeycomb-like structure provides significant strength with minimal weight, and substantially resists torsional forces, rotational forces, and crushing forces many times larger than its weight. Alternative cell shapes are also contemplated, such as rectangular, square, trapezoidal, round, triangular, elliptical, or the like. The payload module(s) 38 may have a curved profile, as shown in FIG. 8, such that a plurality of payload modules may be attached to the UAV 32 to completely enclose and/or circumscribe the payload area underneath the UAV 32 or a fraction thereof, as desired by the user for a particular use or application of the UAV. The payload module(s) 38 may be connected to form a basket-like or other supportive configuration to loosely hold devices, instruments, or the like therein. The payload modules 38 can also be connected in a height-wise fashion underneath the UAV to increase the overall height of the system 30, provide greater ground clearance for the UAV 32, and increasing the carrying capacity as well.

The system 30 may include one or more connectors 42 to facilitate attachment of one or more payload modules 38 to each other, the bracket(s) 36, and/or the UAV 32. In the example shown in FIGS. 9-10, the connector 42 defines a curved body that has a shaped, protruding surface complimentary to the recessed or countersunk region of the payload module 38, in this example being a hexagonal shape. The one or more connectors 42 can thus be inserted into the corresponding cells of two or more modules 38 to secure the modules 38 to one another, without significantly increasing the overall thickness or weight of the payload structure 34. The connectors 42 further include a through-hole to allow the use of bolts, screws, or other fasteners to mount equipment, devices, instruments, or the like at that particular location on the payload structure 34. Though the connector shown in FIGS. 9-10 includes four cells in a "+" like configuration, the number, shape, curvature (e.g., concave or convex profiles), and orientation of the cells may be modified to suit a particular use or application of the UAV 32.

Figure 11:
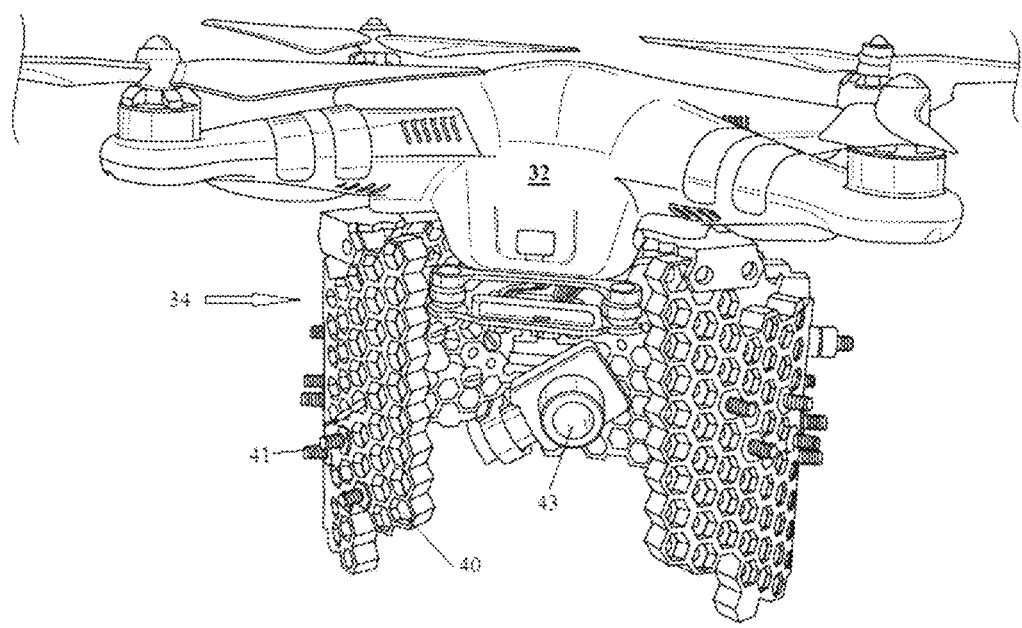
FIG. 11 is an illustration of an example of a configuration of a UAV and payload mounting system constructed in accordance with the principles of the present invention.
Figure 12:
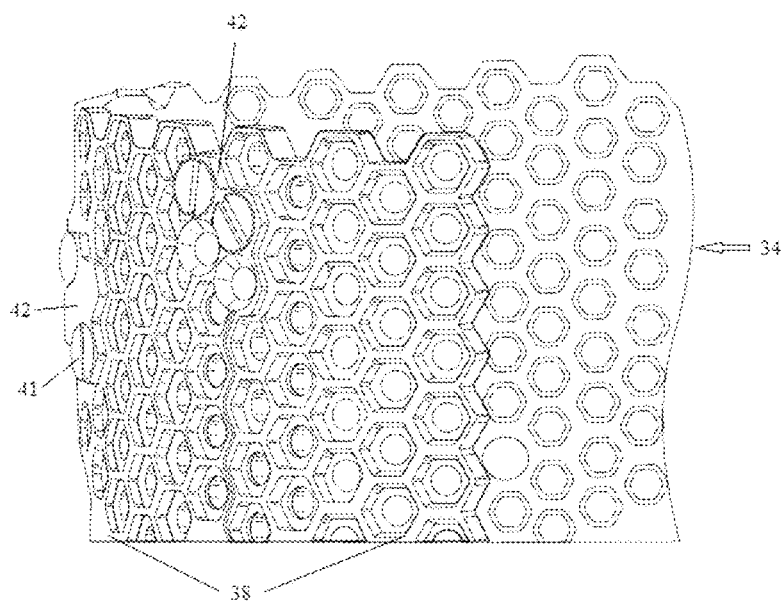
FIG. 12 is another illustration of the UAV and payload mounting system of FIG. 11.

Now referring to FIGS. 11-12, the UAV 32 is shown with an exemplary configuration of the payload structure 34 employed to attach a camera to the payload area of the UAV 32. A plurality of the payload modules 38 is attached to one another by the connectors 42 to substantially circumscribe the lower payload region of the UAV 32.

The modular design of the systems shown herein allow users to quickly and easily assemble desired configurations in the field without the need for specialized tools, and to customize the configuration to add as many linked units as needed. In addition, the systems disclosed herein can replace conventional landing gear entirely, thus eliminating the need for an additional weighted device on the UAV while also allowing users to carry payloads below the blades for safety and to maximize the number of items attached, limited only by the maximum takeoff weight capacity of the drone. The system disclosed herein may include additional features that expand the viability or usefulness of the system for a broader range of applications and uses. For example, the system may include various lighting elements (not shown) providing both visibility of the UAV as well as remote lighting of desired regions on the ground. The systems disclosed herein may also include floatation elements or be constructed from buoyant materials that enable the UAV to safely and effectively land in water without submerging sensitive components or portions of the UAV and/or payload.

The systems provided herein are provide improved UAV customization and capacity for a variety of different industries and applications, including fire rescue, police, fire fighting, cinematography, logistics, cargo/item delivery, and agriculture, to name a few. UAVs can be used to deliver aid or communication devices to those stranded and in need, and out of reach of immediate in-person assistance, such as stranded hikers on a mounting, distressed individuals in a flooded region, or the like. The system can also be used to securely hold objects, packages, and boxes for aerial delivery by a UAV.

It will be appreciated by persons skilled in the art that the present invention is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the examples disclosed herein are not necessarily exclusive of each other and may be included in a variety of different combinations or configurations without departing from the scope and spirit of the invention. A variety of modifications and variations are possible in light of the above teachings without departing from the scope and spirit of the invention, which is limited only by the following claims.

What is claimed is:

1. An unmanned aerial vehicle (UAV) payload system, comprising:
   a plurality of vertically-oriented payload modules configured to attach to the UAV, each payload module defining a curved surface having a plurality of hexagonally-shaped mounting holes therethrough;
   a plurality of connectors interconnecting the plurality of payload modules, wherein each connector defines one or more hexagonally-shaped protrusions matable with the mounting holes; and
   at least one of a video device, photography device, sensor, and instrument mounted to the payload modules.

2. The payload system of claim 1, wherein the plurality of payload modules is sufficiently rigid to support a weight of the UAV when landing.

3. The payload system of claim 1, wherein the interconnected payload modules define a substantially continuous mounting surface around at least a portion of the UAV.

4. The payload system of claim 1, wherein the plurality of payload modules defines a basket configured to carry one or more instruments therein.

5. The payload system of claim 1, wherein each of the plurality of connectors includes four protrusions.

6. The payload system of claim 1, wherein the plurality of mounting holes of each payload module is configured in an elongated configuration having three holes across a width and nine holes along a length of the payload module.

7. The payload system of claim 1, wherein each of the plurality of payload modules is constructed from a buoyant material.

8. The payload system of claim 1, further comprising one or more lighting elements attached to at least one of the payload modules.

9. The payload system of claim 3, wherein the substantially continuous mounting surface defines a circumference between 180 degrees and 300 degrees.

* * * * *